United States Patent [19]

Englund

[11] Patent Number: 5,149,729
[45] Date of Patent: Sep. 22, 1992

[54] WATERBORNE ACRYLIC STAIN COMPOSITION CONTAINING CORE-SHELL GRAFTED POLYMERS

[75] Inventor: Diane J. Englund, Woodinville, Wash.

[73] Assignee: PPG Industries, Inc., Pittsburgh, Pa.

[21] Appl. No.: 517,020

[22] Filed: May 1, 1990

[51] Int. Cl.⁵ .................. C08K 5/06; C08L 67/07; C08F 220/10; C08F 222/04
[52] U.S. Cl. ................... 524/366; 524/377; 523/201; 526/271; 526/328
[58] Field of Search ............ 523/201; 525/384; 524/366

[56] References Cited

U.S. PATENT DOCUMENTS

| | | | |
|---|---|---|---|
| 3,401,134 | 9/1968 | Fantl et al. | 524/819 |
| 4,622,360 | 11/1986 | Gomi et al. | 524/507 |
| 4,876,313 | 10/1989 | Lorah | 525/281 |
| 4,939,189 | 7/1990 | Tobinaga et al. | 523/205 |

Primary Examiner—Joseph L. Schofer
Assistant Examiner—Wu C. Cheng
Attorney, Agent, or Firm—Daniel J. Long

[57] ABSTRACT

A waterborne stain composition for protecting wood surfaces comprising:
(a) a resin component comprising a core-shell polymer having an alkali-insoluble polymer core and an alkali-soluble polymer shell; and
(b) a solvent component comprising water and an organic solvent selected from a glycol and a glycol ether.

21 Claims, No Drawings

WATERBORNE ACRYLIC STAIN COMPOSITION CONTAINING CORE-SHELL GRAFTED POLYMERS

BACKGROUND OF THE INVENTION

The present invention relates to coating compositios for wood surfaces and more particularly to waterborne stain compositions.

Clear sealants and semi-transparent stains for exterior application to wood surfaces have traditionally been formed as oil-based systems having inherent good application and appearance characteristics, with marginal or poor durability. These coatings, however, may exceed regulatory permissible amounts of volatile organic component.

Because of such limitations on volatile organic component waterborne stains have become increasingly important. Such waterborne stains are often formulated from water reducible resins, including alkyds and maleinized linseed oils and commonly employ glycol ethers as coupling solvents in combination with alkaline neutralizers to assure solubility of the resin component in water. In addition, acrylic and vinyl acrylic polymers prepared by emulsion polymerization have also been used in formulating waterborne emulsion stains. While such waterborne stains may have slightly better durability than oil-based systems, they generally compare unfavorably with such oil-bases systems in their application and appearance characteristics.

It is, therefore, an object of the present invention to provide a waterborne acrylic coating composition which has improved application and appearance characteristics and which provides improved protection for the wood surface after application.

SUMMARY OF THE INVENTION

The stain composition of the present invention includes a resin component comprising a core-shell polymer having an alkaline-insoluble polymer core and an alkaline soluble polymer shell. Preferably, the resin component comprises 8 to 22 percent by weight of the composition. The composition also includes a solvent component which comprises water and an organic compound which is either a glycol or a glycol ether and which is preferably present in the amount of 6 to 9 percent by weight of the entire composition. The composition preferably also contains a thickener which is a mixture of a pseudoplastic polysaccharide rhamsan gum and a nonionic polyurethane rheology modifier in the amount of from 0.1 to 0.5 percent by weight. The composition preferably also contains a metal ligand complex such as a zinc ammonium complex as a crosslinking agent. The amount of zinc or other metal from the complex would preferably be from 0.1 to 0.7 percent by weight of the composition.

By using the core-shell polymer in combination with a water and glycol or ether glycol solvent component, waterborne stains are produced with a high degree of durability and with the application and appearance properties of an oil-based stain. The high amount of butyl acrylate in the polymer's inner core gives the flexibility required on dimensionally unstable wood to prevent the flanking and peeling failure experienced with traditional acrylic and vinyl acrylic stains. The composition of the polymer's outer shell, being alkali soluble, allows the stain to be resolubilize itself, thus allowing good lapping characteristics and grain definition found only in a conventional oil stain.

DETAILED DESCRIPTION

The core-shell grafted polymers used in the resin component are described in U.S. Pat. No. 4,876,313, the contents of which are incorporated herein by reference. Essentially, these polymers have an alkali-insoluble, emulsion polymer core and an alkali-soluble, emulsion polymer shell, wherein the core and shell are chemically grafted together to a significant or substantial extent. The core and shell components are chemically grafted together by carrying out the emulsion polymerization of either the core or shell in the presence of at least one polyfunctional compound having (1) two or more sites of unsaturation, (2) two or more abstractable atoms, or (3) a combination of one or ore sites of unsaturation and one or more abstractable atoms. The core-shell polymers of this invention result in polymer compositions having improved stability toward additives (i.e., alcohols, solvents, etc.), redispersibility, foam control, heat resistance and rheology.

In a preferred process, the core-shell polymers are prepared by first emulsion polymerization of the alkali-insoluble core in the presence of the polyfunctional compound, followed by the subsequent emulsion polymerization of the shell in the presence of the previously-prepared core. The weight ratio of the core to the shell preferably is about 85:15 to 15:85, with the core having a weight average molecular weight of greater than about 8,000 and the shell having a weight average molecular weight of about 5,000 to about 100,000 as determined by gel permeation chromatography. The polyfunctional compound preferably has at least two sites of unsaturation of unequal reactivity.

The core and shell are polymerized from monomer selected from methyl acrylate, ethyl acrylate, butyl acrylate, 2-ethylhexyl acrylate, decyl acrylate, methyl methacrylate, ethyl methacrylate, hydroxyethyl methacrylate, butyl methacrylate, acrylonitrile, acrylic acid, methacrylic acid, itaconic acid, maleic acid, fumaric acid, acrylic anhydride, methacrylic anhydride, maleic anhydride, itaconic anhydride, fumaric anhydride, styrene, substituted styrene, vinyl acetate, and other $C_1$ to $C_{12}$ alkyl acrylates and methacrylates.

The core may be polymerized from a mixture of monomers comprising 0 to about 10 percent by weight acid-containing unsaturated monomer. The shell may be polymerized from a mixture of monomers comprising about 40 to about 90 percent by weight methyl methacrylate. The shell may also be polymerized from a mixture of monomers comprising about 20 to about 50 percent by weight acid-containing or anhydride-containing unsaturated monomer. The core-shell polymer may also be neutralized with a base which may be ammonia, triethylamine, monoethanolamine, dimethylaminoethanol, sodium hydroxide or potassium hydroxide.

The polyfunctional compounds are selected from the group consisting of allyl-, methallyl-, vinyl-, and cryotyl-esters of acrylic, methacrylic, maleic (mono- and di-esters), fumaric (mono- and di-esters) and itaconic (mono- and di-esters) acids; allyl-, methallyl-, and crotyl-vinyl ether and thioether; N- and N,N-di-allyl-, methallyl-, crotyl-, and vinyl-amides of acrylic and methacrylic acids; N-allyl-, methallyl-, and crotyl-maleimide; vinyl esters of 3-butenoic and 4-pentenoic acids; diallyl phthalate; triallyl cyanurate; 0-allyl-, methallylcrotyl, 0-alkyl-, aryl-, P-vinyl-P-allyl-, P-crotyl- and P-methallyl-phosphonates; triallyl-, trimethallyl-, and tricrotyl-phosphates; 0-vinyl-, 0,0-diallyl dimethallyl-, and dicrotyl-phosphates; cycloalkenyl esters of acrylic, methacrylic, maleic (mono- and di-esters), fumaric (mono- and di-esters)and itaconic (mono- and di-esters) acids; vinyl ethers and vinyl thioethers of cycloalkenols and cycloalkene thiols; vinyl esters of cycloalkene carboxylic acids; 1,3-butadiene, isoprene and other conjugated dienes, paramethylstyrene; chloromethylstyrene; allyl-, methallyl-, vinyl-, and crotyl-mercaptan; bromotrichloromethane; bromoform; carbon tetrachloride; and carbon tetrabromide.

Alternatively, the process for making these core-shelled polymers may be carried out by adding the polyfunctional compound after the emulsion polymerization of the core, allowing the polyfunctional compound to soak into the core and polymerizing it and subsequently emulsion polymerizing the shell. This technique uses the same monomers for the core and shell and most of the same polyfunctional compounds as used in the first process described above. Additionally, the polyfunctional compound can be selected from ethyleneglycol dimethyacrylate, diethyleneglycol dimethyacrylate, triethyleneglycol dimethacrylate, polyethyleneglycol dimethacrylate, polypropyleneglycol dimethacrylate, neopentylglycol dimethacrylate, 1,3-butyleneglycol diacrylate, neopentylglycol diacrylate, trimethyolethane trimethacrylate, dipentaerythritol triacrylate, dipentaerythritol tetraacrylate, dipentaerythriol pentaacrylate, 1,3-butylene glycol dimethacrylate, trimethylolpropane trimethacrylate, trimethylolpropane triacrylate, tripropylene glycol diacrylate and divinyl benzene.

These polymers may also be prepared by a third process which is carried out by first emulsion polymerizing of the shell in the presence of the polyfunctional compound, followed by emulsion polymerization of the core. Following this technique, the same monomers for the core and shell given above can be used. The polyfunctional compounds useful for this technique are those given in connection with the first above described process.

The weight ratio of the core polymer to the shell polymer is preferably about 85:15 to about 15:85, more preferably about 70:30 to about 30:70, and most preferably about 60:40 to about 40:60. Preferably, the core polymer has a weight average molecular weight greater than about 8,000 and the shell polymer has a weight average molecular weight of about 5,000 to about 100,000 as determined by gel permeation chromatography. Preferably, the glass transition temperature (Tg) of the core polymer is about −65° C. to about 100° C. and the Tg of the shell is greater than about 100° C.

A preferred core-shell polymer which may be used in the composition of the present invention is available from Rohm and Haas Co. as MPF-4302.

As noted above, the solvent component for the penetrating stain of the invention is in large part a water medium in order to satisfy the regulatory requirements as to volatile organic compounds and also to realize other inherent advantages of waterborne systems such as those noted above.

Thus, the most important characteristics for the solvent component according to the present invention is the selection of an organic solvent which is suitably compatible with the resin within the water medium while allowing the resin component to form a protective and esthetically appealing coating as noted above with desired application characteristics.

In general, it is also important to understand that, in stains contemplated by the present invention, the resin component is not in solution but rather is a dispersion in water. For that reason, it was necessary to find a solvent capable of having good stability with the resin within the water medium.

The organic solvent is a glycol or a glycol ether having from 2 to 8 carbon atoms. Suitable glycols would include propylene glycol, ethylene glycol and diethylene glycol. Suitable glycol ethers would include those of propylene glycol methyl ether, dipropylene glycol methyl ether, tripropylene glycol methyl ether, ethylene glycol methyl ether, ethylene glycol ethyl ether, ethylene glycol butyl ether, diethylene glycol methyl ether, diethylene glycol ethyl ether, diethylene glycol butyl ether, propylene glycol propyl ether and propylene glycol butyl ether.

The strain composition of the present invention will also preferably contain a thickening component to provide adequate shear in the grind paste, provide controlled flow and leveling characteristics upon application, provide proper brush drag and brush loading and provide good in-can stability such as minimal syneresis and setting of pigments. The preferred thickener is a combination of pseudoplastic polysaccharide rhamsan gum which is available from the Kelco Division of Merck & Co. under the designation K7C233 and a nonionic polyurethane rheology modifier which is available from Rohm and Haas Company as ACRYLSOL® RM-1020. These thickeners together are used in the amount of 0.1 to 0.5 percent by weight of the entire composition with the preferred amount being 0.2 to 0.4 percent by weight of the composition.

It has also been found that added durability, in the form of decreased early alkali and water sensitivity, can be achieved by the incorporation of a fugative metal ligand complex. To make a stable aqueous composition which contains a polymeric ligand and a polyvalent metal salt, interactions between the polymer and the metal must be minimized. If such minimization is not successfully accomplished, gelation of the coating composition can occur. This minimization is accomplished, therefore, by introducing the metal ion in its soluble form as a weakly charged metal ligand complex, such as a zinc ammonium bicarbonate solution. This divalent metal complex is believed to form a three-dimensional crosslinked network in the polymer, rather than the simple metal-carboxylate salt. Speculation exists as to the nature of the crosslinking cation in these films. It may be that the zinc cation is bound to two or four —COO— groups or the $Zn(NH_3)_2^{++}$ cation is bound to two —COO— groups. In either case, it is important that the ligand be fugative and leave the film during formation. The amount of soluble zinc in the film should be from 0.1 to 0.7 percent based on the total weight of the composition. Preferably, the amount of zinc would be from 0.2 to 0.6 percent by weight and from 0.2 to 0.3 percent when a semi-transparent stain is desired. If these levels of zinc are exceeded, gelation or seeding in the coating could result. In addition to zinc ammonia complexes, metal-ammonia complexes of cadmium, copper or nickel could also be used as could tetraaminezinc(II) complex ion salts and ammonium zirconyl carbonate complexes. A zinc-containing solution which would be suitable for use in the composition of the present invention would be available from Ultra Additives, Inc. as ZINPLEX 15. It has also been found that the addition of amines such as 2-amino-2-methyl-1-propanol, methoxypropylamine, dimethylaminopropylamine and N-aminopropylmorpholine may have a certain degree of efficacy in improving early alkali and water sensitivity in the resulting film.

A pigment component can be included within the stain composition of the present invention, the pigment component itself being generally in accordance with the prior art. Various types of pigments can thus be employed depending upon desired coloration and specific application.

Still other conventional components may be included in the stain composition, with the specific identity, amounts and purposes for those components being substantially similar to other prior art coatings. For example, the stain composition of the present invention may also include surfactants, dispersants, defoamers, driers, water repellants, mildewcides and wood preservatives.

The present invention is further illustrated and exemplified by experimental work including the following examples.

EXAMPLE A

A zinc ammonia carbonate solution was made by mixing the following ingredients:

| Raw Material | Percent by Weight |
| --- | --- |
| Zinc (available from Zinc Corp. of America as KADOX 915) | 8.73 |
| Water | 57.99 |
| 26% by wt. ammonium hydroxide solution | 20.54 |
| Ammonium bicarbonate | 12.74 |
| | 100.00 |

EXAMPLE I

A waterborne semi-transparent exterior wood stain was produced by mixing the following raw materials in the amounts shown.

| Raw Material | Percent by Weight |
| --- | --- |
| Water | 62.0 |
| Propylene glycol | 6.1 |
| Resin solids (core-shell polymer available from Rohm & Haas Co. as MPF-4302) | 18.4 |
| Pigment | 7.0 |
| Rhamsan gum (KELCO K7C233) | 0.1 |
| Rheology modifier (ACRYSOL RM-1020, 20% active) | 0.1 |
| Zinc ammonia carbonate solution of Ex. A | 3.1 |
| Additives* | 3.2 |
| | 100.0 |

*Includes dispersant, preservative, anti-foam, water repellant and mildewcide.

This stain composition had excellent early water and alkali resistance characteristics as evidenced by a test in which it was first applied to a smooth sanded Douglas Fir plywood surface and ambient air dried at 45% relative humidity at room temperature and then placed in fog chamber for 2 hours. The resulting film had a good appearance and was rated for film wash off at a rating of 10 on a scale of 1 to 10.

EXAMPLE II

A waterborne transparent exterior wood stain and clear wood sealer was produced by mixing the following raw materials in the amounts shown.

| Raw Material | Percent by Weight |
| --- | --- |
| Water | 83.5 |
| Propylene glycol | 3.0 |
| Resin solids (core-shell polymer available from Rohm & Haas Co. as MPF-4302) | 10.0 |
| Rhamsan gum (KELCO K7C233) | 0.05 |
| Rheology modifier (ACRYSOL RM-1020, 20% active) | 0.05 |
| Zinc ammonia carbonate solution of Ex. A | 2.25 |
| Additives* | 1.65 |
| | 100.00 |

*Includes preservative, wood preservative, anti-foam, water repellant, mildewcide, UV-absorber and transparent iron oxides.

This stain composition had excellent early water and alkali resistance characteristics as evidenced by a water drop test in which water droplets are placed on a film which had been applied to a sealed LENETA chart and ambient air dried at 45 percent relative humidity and 72° F. for 2 hours. The resulting film showed no softening, blistering, wrinkling or removal and was rated for film integrity at a rating of 10 on a scale of 1 to 10.

What is claimed is:

1. A waterborne stain composition for protecting wood surfaces comprising:
   (a) a resin component comprising a core-shell polymer having an alkali-insoluble polymer core and an alkali -soluble polymer shell; and
   (b) a solvent component comprising water and an organic solvent selected from a glycol and a glycol ether, said organic solvent present in an amount of from about 6 percent to about 9 percent by weight of the entire composition.

2. The composition of claim 1 wherein said core and said shell have been substantially chemically grafted together, said shell and said core being prepared sequentially by emulsion polymerization, and said shell is polymerized from a mixture of monomers comprising about 10 to about 60 percent by weight acid-containing or anhydride-containing unsaturated monomer wherein the ratio of said core to said shell is about 85:15 to about 15:85, said core having a weight average molecular weight of greater than about 8,000 and said shell having a weight average molecular weight of about 5,000 to about 100,000 as determined by gel permeation chromatography.

3. A composition of claim 2 wherein said core and said shell are polymerized from monomers selected from methyl acrylate, ethyl acrylate, butyl acrylate, 2-ethylhexyl acrylate, decyl acrylate, methyl methacrylate, ethyl methacrylate, hydroxyethyl methacrylate, butyl methacrylate, acrylonitrile, acrylic acid, methacrylic acid, itaconic acid, maleic acid, fumaric acid, acrylic anhydride, methyacrylic anhydride, maleic anhydride, itaconic anhydride, fumaric anhydride, styrene, substituted styrene, vinyl acetate and other $C_1$ to $C_{12}$ alkyl acrylates and methacrylates.

4. A composition of claim 2 wherein said core is polymerized from a mixture of monomers comprising 0 to about 10 percent by weight acid-containing unsaturated monomer.

5. A composition of claim 4 wherein said shell is polymerized from a mixture of monomers comprising about 40 to about 90 percent by weight methyl methacrylate.

6. A composition of claim 2 wherein said shell is polymerized from a mixture of monomers comprising about 20 to about 50 percent by weight acid-containing or anhydride-containing unsaturated monomer.

7. A composition of claim 2 wherein said core-shell polymer has been neutralized with a base.

8. A composition of claim 7 wherein said base is selected from the group consisting of ammonia, triethylamine, monoethanolamine, dimethylaminoethanol, sodium hydroxide and potassium hydroxide.

9. A composition of claim 2 wherein the glass transition temperature of said core is about −65° C. to about 100° C. and the glass transition temperature of said shell is greater than about 100° C.

10. A composition of claim 2 wherein said core and said shell are chemically grafted together using one or more polyfunctional compounds selected from
   (a) polyfunctional compounds having two or more sites of unsaturation,
   (b) reactive chain transfer agents having two or more abstractable atoms, and
   (c) hybrid polyfunctional compounds having one or more abstractable atoms and one or more sites of unsaturation.

11. A composition of claim 1 wherein the organic solvent in the solvent component is selected from propylene glycol, ethylene glycol, diethylene glycol, propylene glycol methyl ether, dipropylene glycol methyl ether, tripropylene glycol methyl ether, ethylene glycol methyl ether, ethylene glycol methyl ether, ethylene glycol butyl ether, diethylene glycol methyl ether, diethylene glycol ethyl ether, diethylene glycol butyl ether, propylene glycol propyl ether and propylene glycol butyl ether.

12. The composition of claim 1 wherein the organic solvent in the solvent component is present in an amount of from about 6 percent to about 9 percent by weight of the entire composition.

13. The composition of claim 1 wherein the composition contains a thickener.

14. The composition of claim 13 wherein the thickener is a mixture of a pseudoplastic polysaccharide rhamsan gum and a nonionic polyurethane rheology modifier.

15. The composition of claim 14 wherein the pseudoplastic polysaccharide rhamsan gum and the nonionic polyurethane rheology modifier are together present in an amount of from about 0.1 percent to about 0.5 percent by weight of the entire composition.

16. The composition of claim 1 wherein the composition contains a metal ligand complex.

17. The composition of claim 16 wherein the metal ligand complex is selected from metal-ammonia complexes of zinc, cadmium, copper and nickel and ammonium zirconyl carbonate complexes.

18. The composition of claim 16 wherein the metal in the metal ligand complex is present in the amount of from about 0.1 percent to about 0.7 percent by weight of the entire composition.

19. The composition of claim 1 wherein the composition contains a neutralizing amine selected from the group consisting of 2-amino-2-methyl-1-propanol, methoxypropylamine, dimethylaminopropylamine and N-aminopropylmorpholine.

20. The composition of claim 1 wherein the composition contains a pigment.

21. The waterborne stain composition of claim 11 wherein the solvent is propylene glycol.

* * * * *